US009179142B2

(12) United States Patent
Won

(10) Patent No.: US 9,179,142 B2
(45) Date of Patent: Nov. 3, 2015

(54) IMAGE PROCESSING APPARATUS AND INSPECTING METHOD THEREOF

(71) Applicant: SAMSUNG ELECTRONICS CO., LTD., Suwon (KR)

(72) Inventor: Kang-young Won, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/950,797

(22) Filed: Jul. 25, 2013

(65) Prior Publication Data

US 2014/0036094 A1 Feb. 6, 2014

(30) Foreign Application Priority Data

Aug. 1, 2012 (KR) .......................... 10-2012-0084540

(51) Int. Cl.
*H04N 17/00* (2006.01)
*H04N 17/02* (2006.01)
*H04N 17/04* (2006.01)
*G06F 11/22* (2006.01)
*G09G 5/00* (2006.01)
*H04L 1/24* (2006.01)

(52) U.S. Cl.
CPC ............ *H04N 17/04* (2013.01); *G06F 11/2221* (2013.01); *G09G 5/006* (2013.01); *H04L 1/243* (2013.01); *G09G 2330/12* (2013.01); *G09G 2370/10* (2013.01)

(58) Field of Classification Search
CPC ... H04B 17/00; H04B 17/0085; H04B 17/045
USPC ............................... 348/181; 375/224; 714/56
See application file for complete search history.

(56) References Cited

U.S. PATENT DOCUMENTS

| 5,787,114 | A | 7/1998 | Ramamurthy et al. |
| 6,201,829 | B1 | 3/2001 | Schneider |
| 6,783,078 | B1 | 8/2004 | Leaming |
| 2001/0023492 | A1* | 9/2001 | Cheng et al. ..................... 714/44 |
| 2003/0035473 | A1* | 2/2003 | Takinosawa .................. 375/224 |
| 2008/0238491 | A1 | 10/2008 | Aizawa |
| 2010/0180283 | A1 | 7/2010 | Kim et al. |
| 2011/0314188 | A1* | 12/2011 | Chen ............................... 710/52 |
| 2012/0009883 | A1 | 1/2012 | Shan et al. |

OTHER PUBLICATIONS

European Search Report issued Nov. 11, 2013 in corresponding European Application No. 13170513.9.

* cited by examiner

*Primary Examiner* — Jefferey Harold
*Assistant Examiner* — Omer Khalid
(74) *Attorney, Agent, or Firm* — Staas & Halsey LLP

(57) ABSTRACT

An image processing apparatus including: at least one connector including at least one connection pin configured to be connected to an external device; an interface which interfaces transmission of signals to the connection pin through a first wiring formed between the interface and the connection pin; a switching unit which is switched on to transmit a signal through a second wiring which is formed differently from the first wiring to feedback the signal from the connection pin to the interface; a controller which controls the switching unit to allow the feedback of the signal through the second wiring to transmit a preset test signal from the interface to the first wiring at the time of inspecting a signal transmission state of the connection pin and the first wiring, and determines the signal transmission state based on a change of the test signal feedbacked to the interface through the second wiring.

15 Claims, 6 Drawing Sheets

IMAGE PROCESSING APPARATUS AND INSPECTING METHOD THEREOF

CROSS-REFERENCE TO RELATED APPLICATIONS

This application claims priority from Korean Patent Application No. 10-2012-0084540, filed on Aug. 1, 2012 in the Korean Intellectual Property Office, the disclosure of which is incorporated herein by reference.

BACKGROUND

1. Field

Apparatuses and methods consistent with the exemplary embodiments relate to an image processing apparatus and an inspecting method thereof which is connected to an external device and processes data or signals supplied by the external device, and more particularly, to an image processing apparatus and an inspecting method thereof which inspects a state of a connector through which the external device is connected to the image processing apparatus and internal wirings connected to the connector.

2. Description of the Related Art

An image processing device collectively refers to a device which processes an image signal supplied from the outside, by various methods to display an image based on the processed image signal. The image processing apparatus may include or not include a display panel. The image processing apparatus which does not include the display panel outputs the processed image signal to another display apparatus to display an image on the another display apparatus, and for example, a set-top box falls under this case. The image processing apparatus which includes the display panel displays an image on its display panel based on the processed image signal, and for example, a TV or a monitor falls under this case.

The image processing apparatus has an image processing board built therein to process signals with various features as well as an image signal, and has a connector or a jack installed outside the image processing apparatus to be connected to various external devices in a wired manner. A cable which is electrically connected to the external device is connected to the connector of the image processing apparatus to transmit a signal from the external device to the image processing board of the image processing apparatus. The image processing board processes a signal received through the connector. The connector may have various standards, e.g., universal serial bus (USB).

However, if a signal transmission between the external device and the image processing apparatus is poor, it is not easy to determine which part of the configuration connecting the two apparatuses has electrically caused such poor transmission and to inspect the configuration. For example, the poor signal transmission may have been caused by the external device itself, by the cable connected to the external device, by the connector of the image processing apparatus or by the wiring between the connector and the image processing board. In particular, a normal user who is not aware of the internal configuration of the image processing apparatus and does not have particular inspection equipment cannot determine the signal transmission state of the image processing apparatus. To that end, a structure for determining such signal transmission state without difficulty is necessary.

SUMMARY

Additional aspects and/or advantages will be set forth in part in the description which follows and, in part, will be apparent from the description, or may be learned by practice of the invention.

The foregoing and/or other aspects may be achieved by providing an image processing apparatus including: at least one connector including at least one connection pin configured to be connected to an external device; an interface which interfaces transmission of signals to the connection pin through a first wiring formed between the interface and the connection pin; a switching unit which is switched on to transmit a signal through a second wiring which is formed differently from the first wiring to feedback the signal from the connection pin to the interface; and a controller which controls the switching unit to allow the feedback of the signal through the second wiring to transmit a preset test signal from the interface to the first wiring at the time of inspecting a signal transmission state of the connection pin and the first wiring, and determines the signal transmission state based on a change of the test signal feedbacked to the interface through the second wiring.

The interface may include a first interface module which is connected to the first wiring and interfaces transmission of the signal through the first wiring, and a second interface module which is connected to the second wiring and receives the signal through the second wiring, and the controller may compare packets of the test signal transmitted by the first interface module and the test signal received to the second interface module to determine the change of the test signal.

The interface may operate according to a communication state between a master and a slave based on universal serial bus (USB) standard, and the first interface module may operate in a master communication setting state, and the second interface module may include an on-the-go (OTG) module operating in one of the master and slave.

The controller may change the second interface module to the slave communication setting state to receive the test signal from the first interface module at the time of inspecting the signal transmission state.

The at least one connector may include a plurality of connection pins, and the test signal feedbacked by each of the connection pins may be input to the switching unit, and the controller may sequentially connect one of the connection pins to the second interface module to determine the signal transmission state of the respective connection pins.

The controller may display a determination result of the signal transmission state on the display unit.

The test signal may include a packet of a preset digital code.

The image processing apparatus may further including a display unit; and an image processor which processes an image signal transmitted by the external device connected to the connector, according to a preset image processing operation, and displays an image on the display unit based on the processed image signal.

One aspect may be achieved by providing an inspecting method of an image processing apparatus which includes at least one connector including at least one connection pin configured to be connected to an external device and an interface interfacing transmission of signals to the connection pin through a first wiring formed between the interface and the connection pin, the inspecting method including: performing a switching operation to allow signal transmission to a second wiring which is formed differently from a first wiring to feedback the signal from the connection pin back to the interface; transmitting a preset test signal by the interface through the first wiring; and determining a signal transmission state based on a change of the test signal feedbacked to the interface through the second wiring.

The interface may include a first interface module which is connected to the first wiring and interfaces transmission of the signal through the first wiring, and a second interface module which is connected to the second wiring and receives the signal through the second wiring, and the determining the signal transmission state may include comparing packets of the test signal transmitted by the first interface module and the test signal received to the second interface module to determine the change of the test signal.

The interface may operate according to a communication state between a master and a slave based on USB standard, and the first interface module may operate in a master communication setting state, and the second interface module may include an OTG module operating in one of the master and the slave.

The performing the switching operation to allow signal transmission through the second wiring may include changing the second interface module to the slave communication setting state to receive the test signal from the first interface module.

The at least one connector may include a plurality of connection pins, and the test signal feedbacked by each of the connection pins may be input to the switching unit, and the performing the switching operation to allow the signal transmission through the second wiring may include sequentially connecting one of the connection pins to the second interface module to determine the signal transmission state of the respective connection pins.

The determining the signal transmission state may include displaying a determination result of the signal transmission state.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
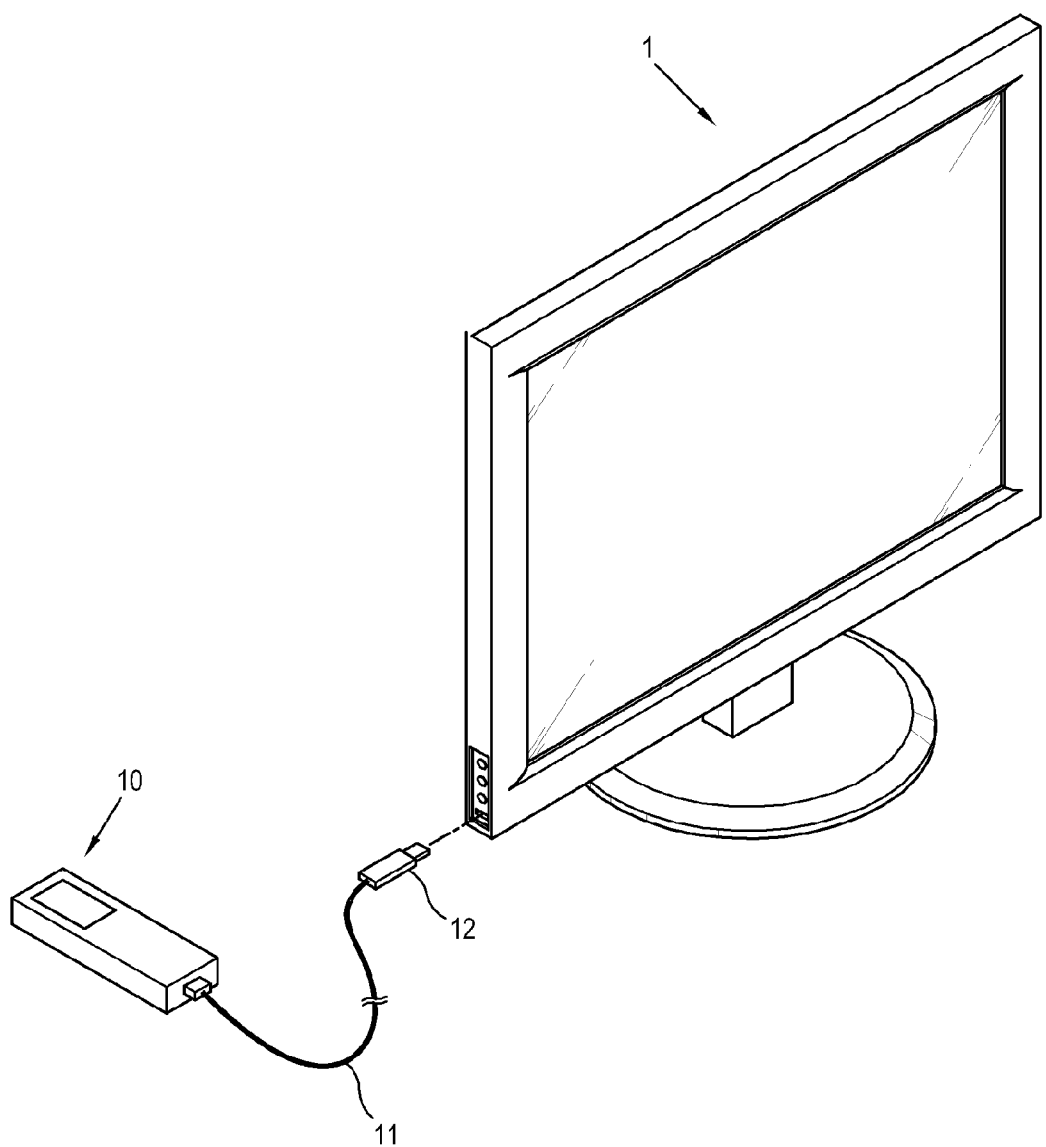
FIG. 1 illustrates an example of an image processing apparatus according to one embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of an image processing apparatus 1 according to one embodiment.

As shown therein, the image processing apparatus 1 according to the embodiment is implemented as a TV which is a display apparatus displaying an image. However, the image processing apparatus 1 which reflects the concept of the embodiment may be implemented as other various devices including a monitor, a portable media player (PMP), a mobile phone, etc. as well as a TV.

The image processing apparatus 1 receives various types of analog/digital signals or digital packets from an external device 10 which is locally connected to the image processing apparatus 1. For example, the image processing apparatus 1 receives and processes an image signal or audio signal supplied by the external device 10, and displays an image and outputs an audio. Otherwise, upon receiving signals including various information/data from the external device 10, the image processing apparatus 1 processes the signal according to a preset process.

The image processing apparatus 1 may transmit signals/packets to the external device 10.

Exchange of signals between the image processing apparatus 1 and the external device 10 is performed in a wired/wireless manner. If the signal is exchanged therebetween in a wired manner, a cable 11 which is electrically connected to the external device 10 is connected to a jack/connector 110 of the image processing apparatus 1 to thereby electrically connect the image processing apparatus 1 and the cable 11. Under such connection structure, the signal is transmitted by the external device 10 to the image processing apparatus 1.

At least one connector 110 of the image processing apparatus 1 is installed in an external part of the image processing apparatus 1. The connector 110 has a shape and structure corresponding to a plug 12 of the cable 11 to be connected to the cable 11 of the external device 10.

The connection method of the image processing apparatus 1 and the external device 10 may employ various standards, e.g., the cable 11 and the connector 110 may be provided according to universal serial bus (USB) standard.

Figure 2:
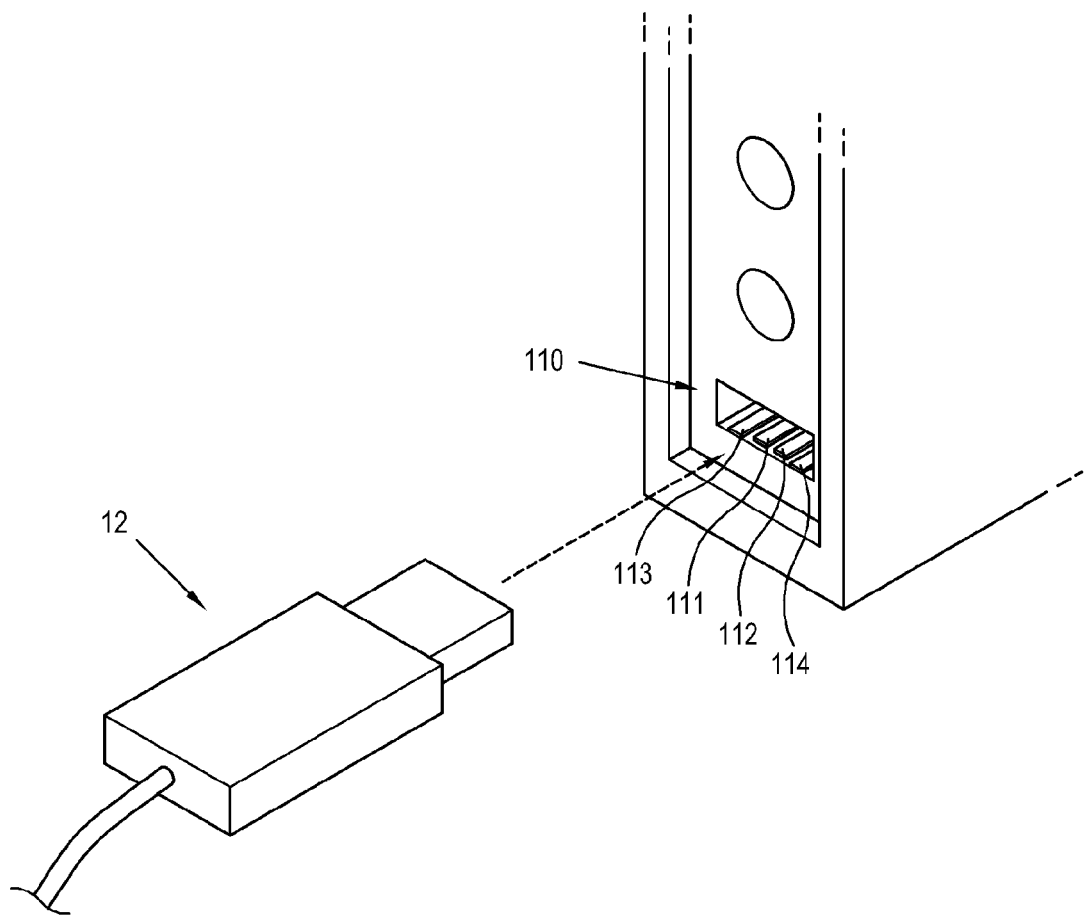
FIG. 2 is a perspective view of a main part of a connector of the image processing apparatus in FIG. 1.

Hereinafter, a configuration of the connector 110 of the image processing apparatus 1 will be described with reference to FIG. 2. FIG. 2 is a perspective view of a main part of the connector 110 of the image processing apparatus 1.

As shown therein, the connector 110 and plug 12 according to the present embodiment are implemented according to the USB standard. The USB is one of input/output standards for connecting peripheral devices such as a mouse, printer, or storage medium to a computer. USB is a serial port protocol, and has representative versions of 1.0, 1.1, 2.0 and 3.0. Currently, USB is used to connect various types of electronic devices including the image processing apparatus 1 beyond simply connecting a computer and peripheral devices.

USB supports hot plug or hot swap to connect or disconnect the external device 10 while the image processing apparatus 1 is being used. That is, while the image processing apparatus 1 operates, the plug 12 may be connected to or disconnected from the connector 110 so that a user may connect and disconnect the image processing apparatus 1 and the external device 10.

The connector 110 in FIG. 2 is an example of USB 2.0 standard. The connector 110 includes four connection pins 111, 112, 113 and 114 connected to power, data and ground.

The first and second connection pins 111 and 112 are expressed as Data− and Data+, respectively, and used to transmit data. The third connection pin 113 is a power supply pin supplying 5V from an SMPS (not shown) of the image processing apparatus 1. The fourth connection pin 114 is connected to the ground. However, this is an example only and may be changed depending on the standard and version of the connector 110.

If the plug 12 is connected to the connector 110, the image processing apparatus 1 may supply power to the external device 10 through the third connection pin 113. The image processing apparatus 1 may exchange data packet with the external device 10 through the first and second connection pins 111 and 112.

Figure 3:
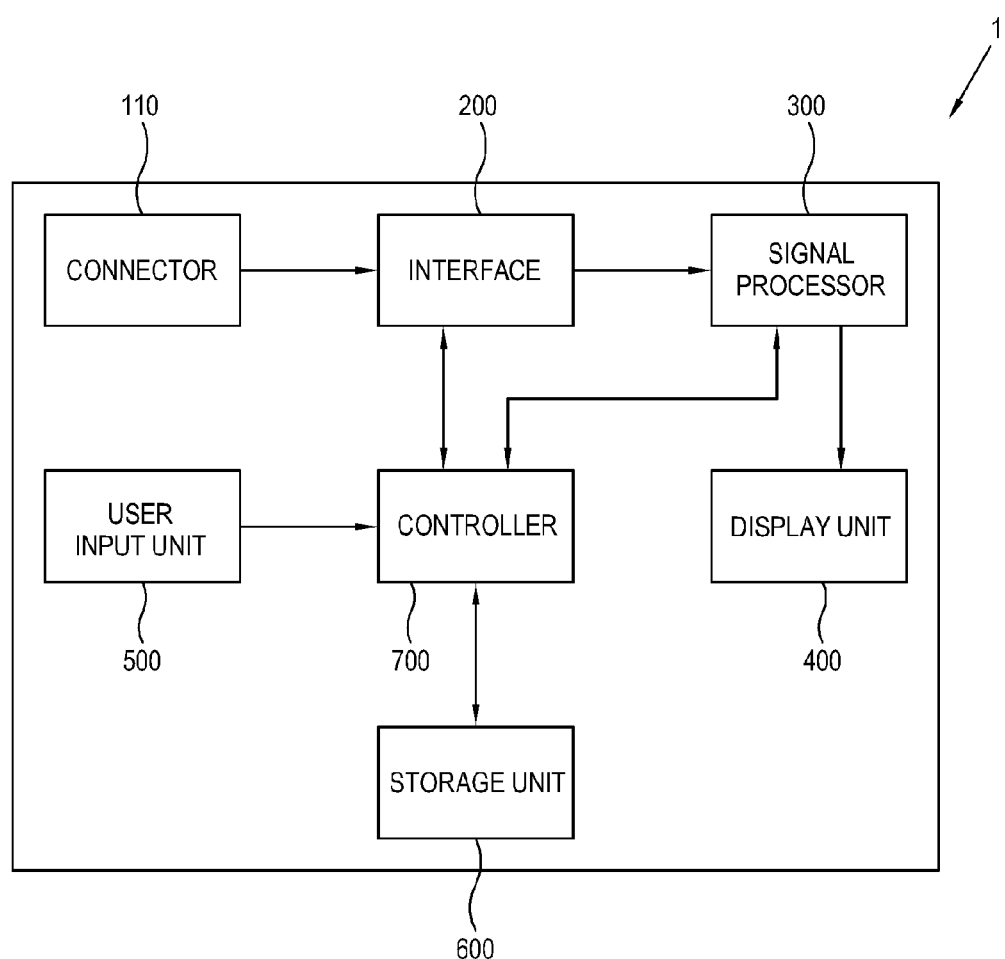
FIG. 3 is a block diagram of the image processing apparatus in FIG. 1.

Hereinafter, a detailed configuration of the image processing apparatus 1 will be described with reference to FIG. 3. FIG. 3 is a block diagram of the image processing apparatus 1.

As shown therein, the image processing apparatus 1 includes a connector 110 to which an external device 10 is connected, an interface 200 which interfaces signals or packet from the external device 10 connected to the connector 110, a signal processor 300 which processes a signal transmitted by the interface 200, according to preset various processes, a display unit 400 which displays an image thereon based on a signal if the signal is an image signal processed by the signal processor 300, a user input unit 500 which outputs a preset command according to a user's manipulation, a storage unit 600 which stores unlimited data/information therein, and a controller 700 which controls various operations of the image processing apparatus 1.

The connector 110 is installed in an external part of the image processing apparatus 1 to enable easy access of a user or the external device 10 and is connected to a cable of the external device 10 to exchange signals with the external device 10. The connector 110 is implemented according to various standards such as universal serial bus (USB), component, and high definition multimedia interface (HDMI) to transmit and receive signals according to the foregoing standards.

The connector 110 is used to be connected to the external device 10 in a wired manner, and the image processing apparatus 1 may further include a wireless communication module (not shown) to be connected to the external device 10 in a wireless manner.

The interface 200 transmits a signal from the connector 110 to the controller 700 or the signal processor 300, or from the controller 700 or the signal processor 300 to the connector 110. The interface 200 relays, transmits and interfaces signals among elements of the image processing apparatus 1. The interface 200 according to the present embodiment is separately provided from the signal processor 300 and the controller 700, but may otherwise be integrally provided or incidental to the signal processor 300 or the controller 700.

If the connector 110 is based on the USB standard, the interface 200 may be implemented as a USB controller module which is connected to the connector 110 and controls signal transmission performed through the connector 110.

The signal processor 330 processes the signal transmitted by the interface 200, according to a preset process. For example, if a signal transmitted to the connector 110 and the interface 200 is an image signal, the signal processor 300 processes the image signal according to the image processing operation and outputs the processed image signal to the display unit 400 to display an image on the display unit 400 based on the image signal.

The image processing operation of the signal processor 300 may include, but not limited to, a de-multiplexing operation for dividing a predetermined signal by nature, a decoding operation corresponding to an image format of an image signal, a de-interlacing operation for converting an interlace image signal into a progressive image signal, a scaling operation for adjusting an image signal into a preset resolution, a noise reduction operation for improving an image quality, a detail enhancement operation, a frame refresh rate conversion, etc.

If the signal transmitted by the interface 200 is an audio signal or data signal, the signal processor 300 processes the signal consistently with the nature of the signal. The performance of the processing operation by the signal processor 300 may be decided in consideration of the nature of the signal transmitted by the interface 200 at the time when the image processing apparatus 1 is designed.

The signal processor 300 is implemented as an image processing board (not shown) which is formed by mounting various chipsets (not shown), memories (not shown), electronic parts (not shown), wirings (not shown), etc. on a printed circuit board (PCB) (not shown) to perform the foregoing image processing operations.

The display unit 400 displays an image thereon based on an image signal output by the signal processor 300. The display unit 400 may be implemented as various display panels including liquid crystal, plasma, light-emitting diode (LED), organic light-emitting diode (OLED), surface-conduction electron-emitter, carbon nano-tube, and nano-crystal, but not limited thereto.

The display unit 400 may further include additional elements depending on its embodiment type. For example, the display unit 400 as an LCD type which does not emit light by itself may include an LCD panel (not shown), a backlight unit (not shown) to emit light to the LCD panel, and a panel driving substrate (not shown) to drive the LCD panel (not shown).

The user input unit 500 outputs preset various control commands or unlimited information by a user's manipulation and input. The user input unit 500 may be implemented as a menu key and an input panel installed in an external part of the image processing apparatus 1, or a remote controller which is separated/spaced from the image processing apparatus 1.

The user input unit 500 may be integrally formed in the display unit 400. That is, if the display unit 400 is a touch screen, a user may input a preset command through an input menu (not shown) displayed on the display unit 400.

The storage unit 600 is implemented as a non-volatile memory such as a flash memory or a hard disc drive. The storage unit 600 stores therein various data. The storage unit 600 is accessed by the controller 700, and data stored therein may be read/written/modified/deleted/updated by the controller 700.

With the foregoing configuration, if the external device 10 connected to the connector 110 transmits image data, the signal processor 300 processes the image data and displays an image on the display unit 400 based on processed image data. The signal processor 300 processes the signal consistently with the nature of the signal transmitted to the connector 110.

However, if a transmission error occurs in a predetermined location while the image data are being transmitted by the external device 10 to the signal processor 300, the image displayed on the display unit 400 may be deteriorated. Such deterioration results from an external issue and an internal issue of the image processing apparatus 1.

The external issue of the image processing apparatus 1 lies in the external device 10 or in the cable 11 of the external device 10 connected to the connector 110. The internal issue of the image processing apparatus 1 may be the state of the connector 110 or a signal wiring between the connector 110 and the interface 200.

If deterioration is caused by the former case, a user should replace the external device 10 or the cable 11 to determine the ground for deterioration. In this case, a user should prepare additional external device 10 or cable 11.

If deterioration is caused by the latter case, it is not easy for user to determine it. Normal users are not well aware of the structure of the image processing apparatus 1, and do not have inspection tools (not shown) to inspect the problem of the signal transmission structure. Thus a user may not determine the state of signal transmission between the connector 110 and the interface 200.

Thus, the image processing apparatus 1 according to the embodiment employs the following structure for inspecting the state of signal transmission of the connector 110 and the state of signal transmission between the connector 110 and the interface 200.

Figure 4:
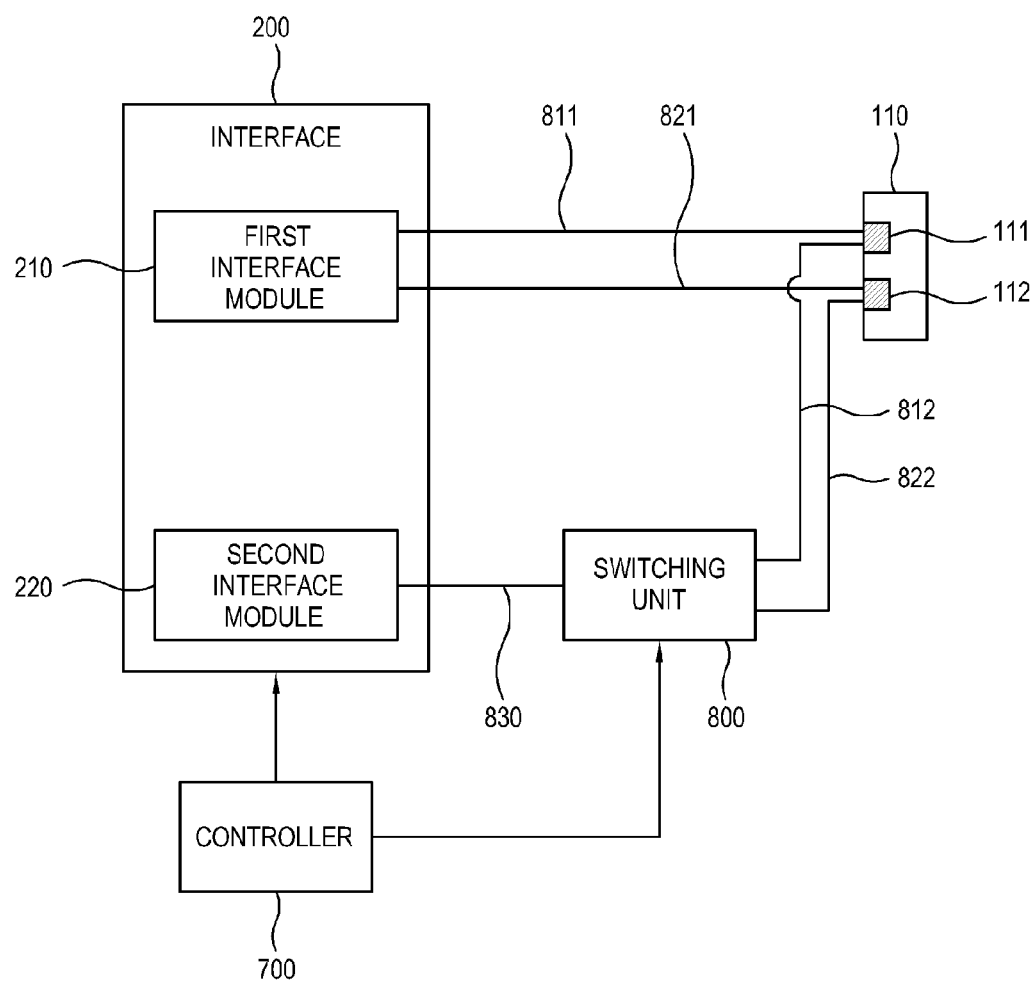
FIG. 4 is a block diagram showing a structure for inspecting a signal transmission state of the image processing apparatus in FIG. 1.

FIG. 4 is a block diagram showing the structure for inspecting the signal transmission of the image processing apparatus 1 according to an embodiment.

FIG. 4 illustrates only one connector 110, and the number of the connector 110 and connection pins 111 and 112 are not limited to implement the embodiment. That is, even if the number of the connector 110 and connection pins 111 and 112 is larger than that shown in FIG. 4, the embodiment may apply.

It should be noted that FIG. 4 illustrates only the configuration that directly relates to the embodiment to briefly and clearly explain the embodiment.

As shown therein, a single connector 110 includes a first connection pin 111 and a second connection pin 112. The first connection pin 111 is connected to the interface 200 through a first wiring 811. In the embodiment, the first connection pin 111 will be described.

The first connection pin 111 is connected to a switching unit 800 through a second wiring 812 which is different from the first wiring 811. The switching unit 800 is connected to the interface 200 through a third wiring 830.

The switching unit 800 is controlled by the controller 700, and is selectively switched on and off to transmit signals between the second and third wirings 812 and 830. That is, the controller 700 may control the switching operation of the switching unit 800 to allow or block transmission of the signal from the second wiring 812 to the interface 200.

The interface 200 includes a first interface module 210 which is connected to the first wiring 811 and interfaces transmission and reception of signals through the first wiring 811, and a second interface module 220 which is connected to the third wiring 830 and receives signals through the third wiring 830.

To exchange signals according to USB 2.0 between the image processing apparatus 1 and the external device 10, the image processing apparatus 1 should operate according a master communication setting based on its standard, and the external device 10 should operate according to a slave communication setting based on its standard.

Details on the master and slave communication settings are set forth in USB 2.0 standard, and will not be repeated herein. Terms which have the same meaning as the master and slave may include host and device, or host and slave.

That is, if the interface 200 is implemented according to USB 2.0 standard, the first interface module 210 operates in a master communication setting state and may communicate with the external device 10 which operates in a slave communication setting state.

The second interface module 220 is implemented as an on-the-go (OTG) module. The OTG module may operates both in master and slave communication setting states by a control of the controller 700 rather than operating in either the master or slave communication setting state.

OTG is a concept which is defined by USB 2.0 standard, and enables a device to change the master and slave communication setting states. If there is a first device operating on the basis of OTG, the first device may change to the master or slave communication setting state depending on the communication setting state of a connected device.

For example, upon connection to a computer which is set in a master communication setting state, the first device operates in a slave communication setting state, and upon connection to a peripheral device set in a slave communication setting state, the first device operates in the master communication setting state to enable signal transmission based on USB.

With the foregoing configuration, upon occurrence of an event for inspecting the signal transmission state of the first connection pin 111 and the first wiring 811 by the user input unit 500, the controller 700 operates as follows:

The controller 700 adjusts the communication setting state or interface setting of the second interface module 220 to a slave state, and switches the switching unit 800 to apply a current to the second and third wirings 812 and 830. Then, the signal transmitted by the interface 200 to the first connection pin 111 through the first wiring 811 may be feedbacked to the interface 200 through the second and third wirings 812 and 830.

The controller 700 transmits a preset test packet from the first interface module 210 to the first wiring 811. The test packet may be a predetermined digital code stored in the storage unit 600 or generated by the controller 700 through a preset algorithm, and is not restricted in its content.

The test packet is transmitted to the first connection pin 111 through the first wiring 811, and transmitted to the switching unit 800 through the second wiring 812. The switching unit 800 has closed the second and third wirings 812 and 830, and the test packet is transmitted to the second interface module 220 through the third wiring 830. The first interface module 210 operates in the master communication setting state and the second interface module 220 operates in the slave communication setting state, and thus the second interface module 220 may receive the test packet.

The controller 700 compares the test packet at the time when the first interface module 210 transmits, and the test packet at the time when the second interface module 220 receives. If the packets are identical according to the comparison result, the controller 700 determines that the signal transmission state of the first connection pin 111 and the first wiring 811 is good or normal. If the packets are not identical according to the comparison result, the controller 700 determines that the signal transmission state of the first connection pin 111 and the first wiring 811 is bad or abnormal.

The controller 700 may display the determination result on the display unit 400 to notify a user of the result.

In the case of the second connection pin 112, the foregoing embodiment may be used to determine the signal transmission state of the second connection pin 112 and the first wiring 821 connected thereto. While the switching unit 800 is switched on to apply a current to the second wiring 822 connected to the second connection pin 112, with respect to the third wiring 830, the controller 700 performs a loop-back of the test packet through the first to third wirings 821, 822 and 830 and determines the signal transmission state.

As described above, in examining the signal transmission state of the first connection pin 111 and the first wiring 811, the controller 700 controls the switching unit 800 to allow signal feedback through the second and third wirings 812 and 830. The controller 700 controls the test packet to be transmitted by the interface 200 through the first wiring 811, and determines the signal transmission state of the first connection pin 111 and the first wiring 811 based on the change in the test packet feedbacked through the third wiring 830.

Then, the determination result is provided for a user to determine the signal transmission state of the image processing apparatus 1.

Figure 5:
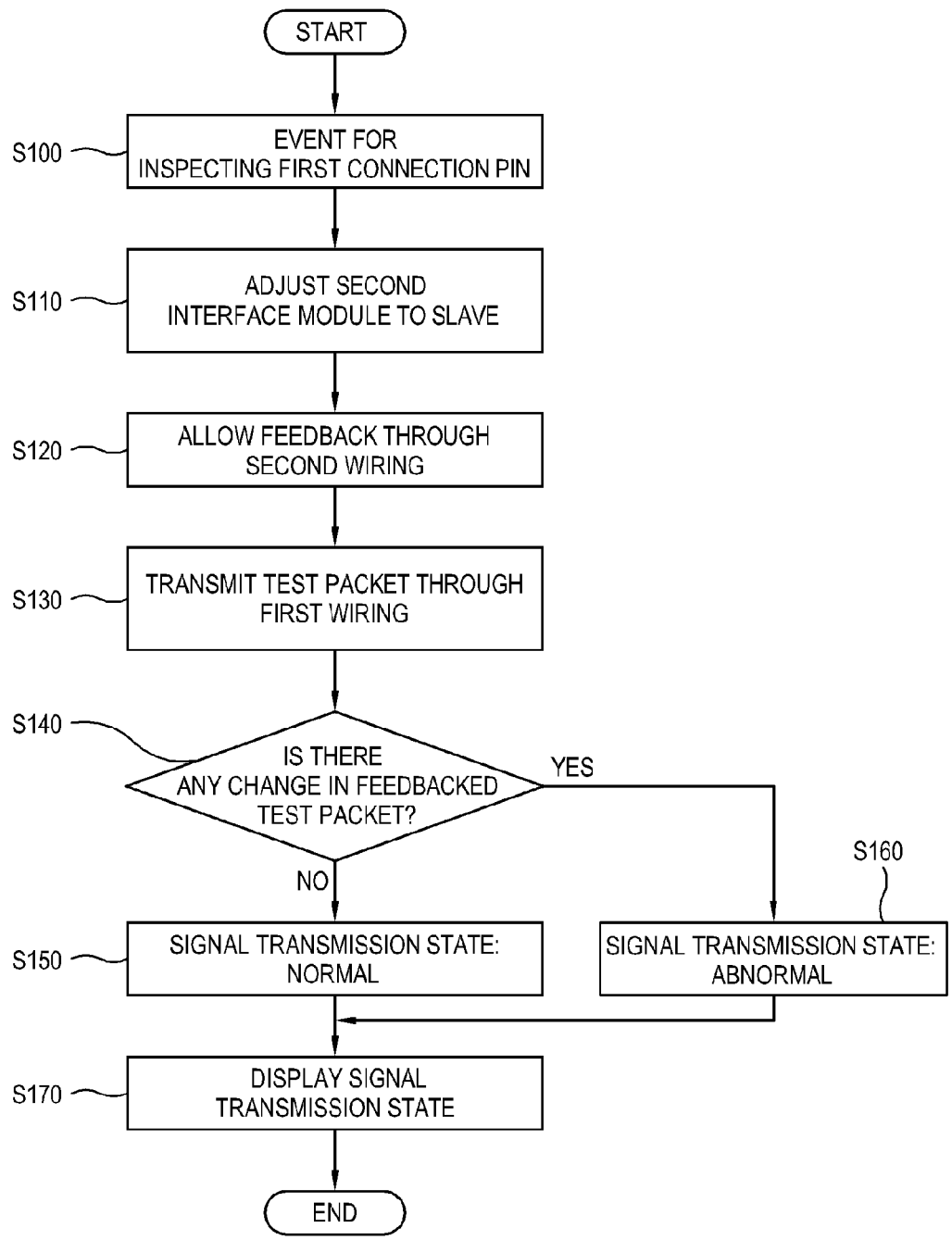
FIG. 5 is a control flowchart showing a process of inspecting a signal transmission state of a first connection pin and a first wiring of the image processing apparatus in FIG. 1.

Hereinafter, a process of inspecting the signal transmission state of the first connection pin 111 and the first wiring 811 of the image processing apparatus 1 according to an embodiment will be described with reference to FIG. 5. FIG. 5 is a control flowchart showing the aforementioned process, and the basic circuit configuration relies upon FIG. 4.

As shown in FIG. 5, if an inspection event for the first connection pin 111 occurs (S100), the controller 700 adjusts the communication setting state of the second interface module 220 to the slave or device state (S110). The controller 700 switches on the switching unit 800 to allow the feedback of the signal by the first connection pin 111 through the second wiring 812 (S120).

The controller 700 transmits the test packet from the first interface module 210 to the first wiring 811 (S130). If the test packet is feedbacked to the second interface module 220, the controller 700 determines whether there is any change in the transmitted test packet (S140).

If there is no change in the transmitted test packet, the controller 700 determines that the signal transmission state of the first connection pin 111 and the first wiring 811 is normal (S150). If there is any change in the transmitted test packet, the controller 700 determines the signal transmission state of the first connection pin 111 and the first wiring 811 is abnormal (S160).

The controller 700 displays the determined signal transmission state (S170).

Figure 6:
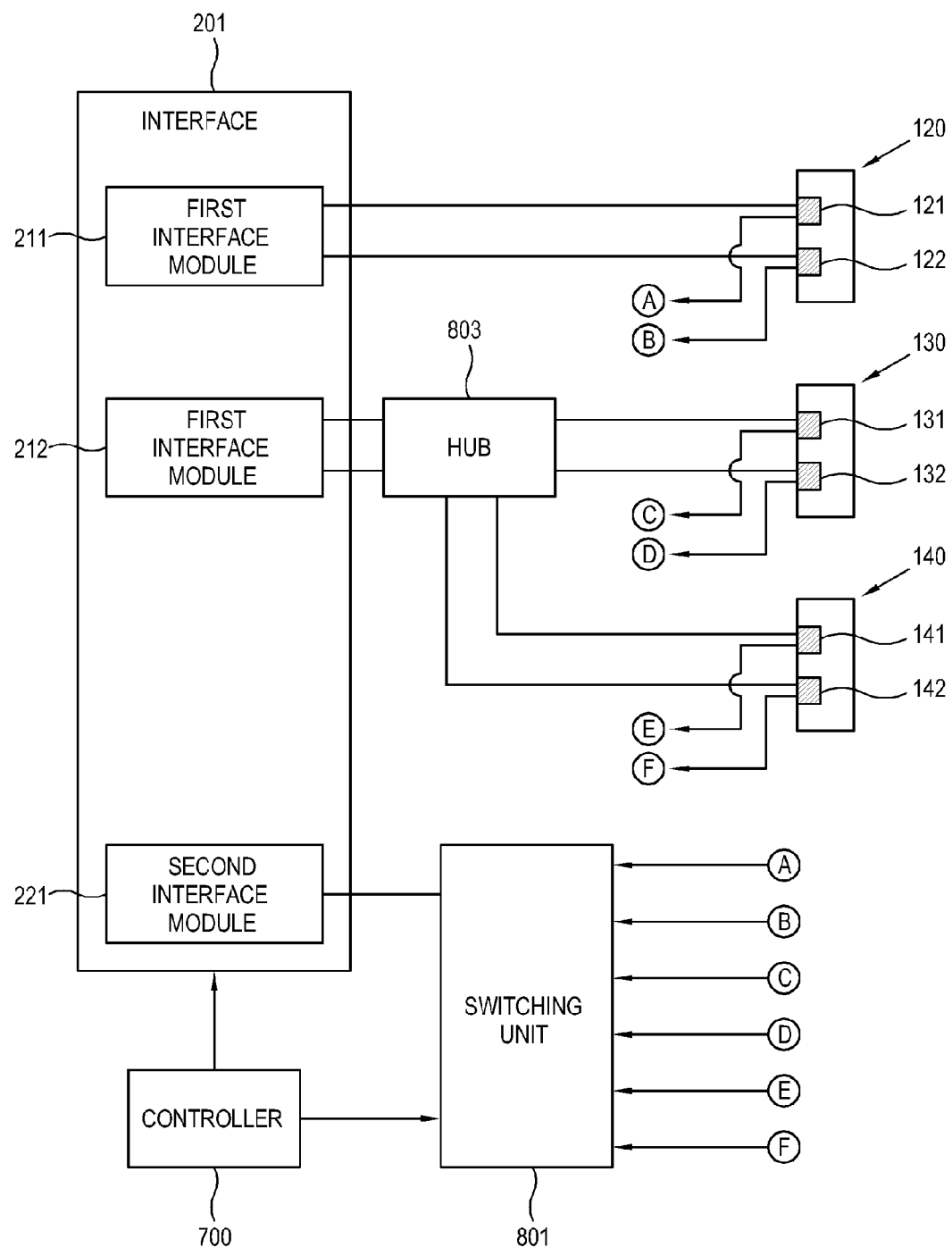
FIG. 6 is a block diagram showing a structure for inspecting a signal transmission state of an image processing apparatus according to one embodiment.

The embodiment below which is different from the above embodiment will be described with reference to FIG. 6. FIG. 6 is a block diagram showing a structure for inspecting the signal transmission state of the image processing apparatus 1.

As shown therein, an interface 201 includes two first interface modules 211 and 212 and a single second interface module 221. The first interface modules 211 and 212 and the second interface module 221 have the same configurations and substantially the same functions as those according to the above embodiment.

The first connector 120 which includes connection pins 121 and 122 is connected to the first interface module 211. The second connector 130 which includes connection pins 131 and 132, and the third connector 140 which includes connection pins 141 and 142 are connected to the first interface module 212 through a hub 803.

A switching unit 801 blocks a signal from the connection pins 121, 122, 131, 132, 141 and 142 transmitted to the second interface module 221 or allows one of signals transmitted by the connection pins 121, 122, 131, 132, 141 and 142 to the second interface module 221. The switching operation of the switching unit 801 is controlled by the controller 700.

With the foregoing configuration, upon occurrence of an inspection event regarding the signal transmission state of the connection pins 121, 122, 131, 132, 141 and 142, the controller 700 controls the switching unit 801 to sequentially apply a current to the connection pins 121, 122, 131, 132, 141 and 142 with respect to the second interface module 221.

The test packet is transmitted by the first interface modules 211 and 212 to one of the conductive connection pins 121, 122, 131, 132, 141 and 142 with respect to the second interface module 221. The controller 700 determines the signal transmission state of the connection pins 121, 122, 131, 132, 141 and 142 based on the test packet feedbacked to the second interface module 221.

If the determination of the signal transmission state of one of the connection pins 121, 122, 131, 132, 141 and 142 is completed, the controller 700 repeats the aforementioned process for the next connection pins 121, 122, 131, 132, 141 and 142.

If the determination of the signal transmission state of the connection pins 121, 122, 131, 132, 141 and 142 is completed, the controller 700 displays the final determination result on the display unit 400 to notify a user whether the connection pins 121, 122, 131, 132, 141 and 142 are normal or abnormal.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. An image processing apparatus comprising:
a connector comprising a connection pin configured to be connected to an external device;
an interface which interfaces transmission of signals to the connection pin through a first wiring formed between the interface and the connection pin;
a switching unit which is switched on to transmit a signal through a second wiring which is formed differently from the first wiring to feedback the signal from the connection pin to the interface; and
a controller which controls the switching unit to allow the feedback of the signal through the second wiring to transmit a preset test signal from the interface to the first wiring at the time of inspecting a signal transmission state of the connection pin and the first wiring, and determines the signal transmission state based on a change of the test signal feedbacked to the interface through the second wiring,
wherein the interface comprises a first interface module which is connected to the first wiring and interfaces transmission of the signal through the first wiring, and a second interface module which is connected to the second wiring and receives the signal through the second wiring, and wherein the switching unit is directly connected to the connection pin, the second interface module, and the controller.

2. The image processing apparatus according to claim 1, wherein the controller compares packets of the test signal transmitted by the first interface module and the test signal received to the second interface module to determine the change of the test signal.

3. The image processing apparatus according to claim 2, wherein the interface operates according to a communication state between a master and a slave based on universal serial bus (USB) standard, and the first interface module operates in a master communication setting state, and the second interface module comprises an on-the-go (OTG) module operating in one of the master and slave.

4. The image processing apparatus according to claim 3, wherein the controller changes the second interface module to the slave communication setting state to receive the test signal from the first interface module at the time of inspecting the signal transmission state.

5. The image processing apparatus according to claim 2, wherein the connection pin comprises a plurality of connection pins, and the test signal is feedbacked by each of the connection pins and is input to the switching unit, and the controller sequentially connects one of the connection pins to the second interface module to determine the signal transmission state of the respective connection pins.

6. The image processing apparatus according to claim 1, wherein the controller displays a determination result of the signal transmission state on the display unit.

7. The image processing apparatus according to claim 1, wherein the test signal comprises a packet of a preset digital code.

8. The image processing apparatus according to claim 1, further comprising a display unit; and
an image processor which processes an image signal transmitted by the external device connected to the connector, according to a preset image processing operation, and displays an image on the display unit based on the processed image signal.

9. An inspecting method of an image processing apparatus which comprises a connector comprising a connection pin configured to be connected to an external device and an interface interfacing transmission of signals to the connection pin through a first wiring formed between the interface and the connection pin, the inspecting method comprising:
performing a switching operation to allow signal transmission to a second wiring which is formed differently from a first wiring to feedback the signal from the connection pin back to the interface;
transmitting a preset test signal by the interface through the first wiring; and
determining a signal transmission state based on a change of the test signal feedbacked to the interface through the second wiring,
wherein the interface comprises a first interface module which is connected to the first wiring and interfaces transmission of the signal through the first wiring, and a second interface module which is connected to the second wiring and receives the signal through the second wiring, and wherein the switching unit is directly connected to the connection pin, the second interface module, and the controller.

10. The inspecting method according to claim 9, wherein the determining the signal transmission state comprises comparing packets of the test signal transmitted by the first interface module and the test signal received to the second interface module to determine the change of the test signal.

11. The inspecting method according to claim 10, wherein the interface operates according to a communication state between a master and a slave based on USB standard, and the first interface module operates in a master communication setting state, and the second interface module comprises an OTG module operating in one of the master and the slave.

12. The inspecting method according to claim 11, wherein the performing the switching operation to allow signal transmission through the second wiring comprises changing the second interface module to the slave communication setting state to receive the test signal from the first interface module.

13. The inspecting method according to claim 10, wherein the connection pin comprises a plurality of connection pins, and the test signal is feedbacked by each of the connection pins and is input to the switching unit, and the performing the switching operation to allow the signal transmission through the second wiring comprises sequentially connecting one of the connection pins to the second interface module to determine the signal transmission state of the respective connection pins.

14. The inspecting method according to claim 9, wherein the determining the signal transmission state comprises displaying a determination result of the signal transmission state.

15. The image processing apparatus according to claim 2, wherein if the packets are not identical according to the comparison result, the controller determines that the signal transmission state of the connection pin and the first wiring is not normal.

* * * * *